US012670679B2

(12) United States Patent
Mcdavitt et al.

(10) Patent No.: US 12,670,679 B2
(45) Date of Patent: Jun. 30, 2026

(54) OPTICAL ALIGNMENT METHOD AND SYSTEM FOR TRANSPARENT DISPLAYS TO OVERCOME PARALLAX

(71) Applicant: Eagle Technology, LLC, Melbourne, FL (US)

(72) Inventors: Daniel Mcdavitt, Roswell, GA (US); James Parker, Alpharetta, GA (US)

(73) Assignee: Eagle Technology, LLC, Melbourne, FL (US)

( * ) Notice: Subject to any disclaimer, the term of this patent is extended or adjusted under 35 U.S.C. 154(b) by 175 days.

(21) Appl. No.: 18/422,417

(22) Filed: Jan. 25, 2024

(65) Prior Publication Data

US 2025/0245944 A1      Jul. 31, 2025

(51) Int. Cl.
*G06T 19/20*        (2011.01)
*G06F 3/01*         (2006.01)
(Continued)

(52) U.S. Cl.
CPC .............. *G06T 19/20* (2013.01); *G06F 3/013* (2013.01); *G06T 7/70* (2017.01); *G06T 19/006* (2013.01);
(Continued)

(58) Field of Classification Search
CPC ......... G06T 19/20; G06T 7/70; G06T 19/006; G06T 2207/30252; G06T 2219/2004; G06F 3/013
(Continued)

(56) References Cited

U.S. PATENT DOCUMENTS 8,941,683 B2    1/2015 Son et al.
9,152,173 B2    10/2015 Lee et al.
(Continued)

FOREIGN PATENT DOCUMENTS

JP        H10-283158 A    10/1998
WO        2016/176973 A1    11/2016
(Continued)

OTHER PUBLICATIONS

English translation of WO-2023228752-A1 (Year: 2023).*
(Continued)

*Primary Examiner* — Ramya P Burgess
*Assistant Examiner* — Preston Jay Miller
(74) *Attorney, Agent, or Firm* — Edell, Shapiro & Finnan, LLC

(57) ABSTRACT

A method is performed using a transparent display alignment system in a vehicle. The transparent display alignment system includes a transparent display through which a user's eyes behind the transparent display view an external scene in front of the transparent display. The method comprises: receiving an eye position of the eyes, a vehicle position for the vehicle, and an external object position of an external object in the external scene; computing a parallax-free position on the transparent display that intersects with a line-of-sight from the eye position to the external object position through the transparent display, at least based on the eye position, the vehicle position, and the external object position; and positioning a graphic object on the transparent display at the parallax-free position to align the eye position, the graphic object, and the external object to avoid parallax when the eyes view the external object through the transparent display.

8 Claims, 12 Drawing Sheets

(51) Int. Cl.
   *G06T 7/70*      (2017.01)
   *G06T 19/00*     (2011.01)
(52) U.S. Cl.
   CPC .............. *G06T 2207/30252* (2013.01); *G06T*
              *2219/2004* (2013.01)
(58) Field of Classification Search
   USPC ......................................................... 701/436
   See application file for complete search history.

(56)       References Cited

U.S. PATENT DOCUMENTS

| | | | |
|---|---|---|---|
| 2011/0052009 A1* | 3/2011 | Berkovich | ............. G02B 27/01 |
| | | | 382/106 |
| 2017/0041598 A1 | 2/2017 | Smithwick | |
| 2019/0196192 A1* | 6/2019 | Aymeric | ............. G05D 1/0016 |
| 2024/0087491 A1* | 3/2024 | Jiang | ....................... B60K 35/81 |
| 2024/0144612 A1* | 5/2024 | Lim | ........................ G01S 5/163 |

FOREIGN PATENT DOCUMENTS

| | | | | | |
|---|---|---|---|---|---|
| WO | WO-2023031933 A1 * | 3/2023 | ............. | H04N 13/32 |
| WO | WO-2023228752 A1 * | 11/2023 | .............. | B60R 1/29 |

OTHER PUBLICATIONS

Savas Tay, "IR Sensitive Photorefractive Polymers, the First Update-able Holographic 3D Display", A Dissertation Submitted to the Faculty of the College of Optical Sciences In Partial Fulfillment of the Requirement For the Degree of Doctor of Philosophy In the Graduate College The University of Arizona, 2007, 232 pages.
Quinn Smithwick, "A Switched Emissive Transparent Display with Controllable per-pixel Opacity", Journal of the Society for Information Display. Sep. 2016;24(9):537-44, 10 pages.
Geeyoung Sung, et al., "Enhancement of the effective viewing window for holographic display with amplitude-only SLM", Proc. SPIE 9391, Stereoscopic Displays and Applications XXVI, 939102 (Mar. 17, 2015): doi. 10.1117/12.2082768, 9 pages.

\* cited by examiner

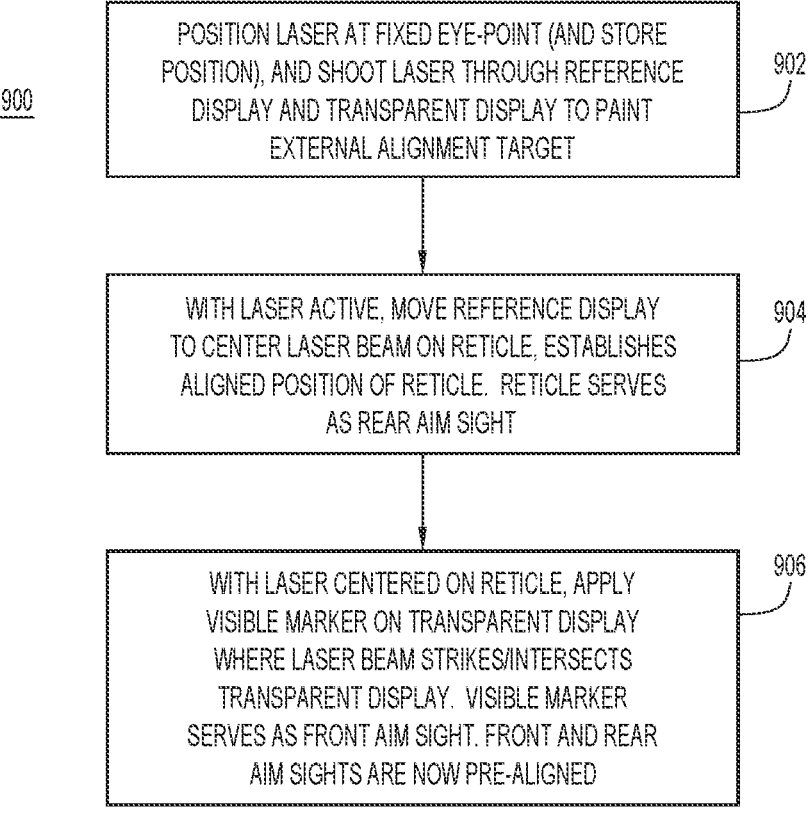

900

POSITION LASER AT FIXED EYE-POINT (AND STORE POSITION), AND SHOOT LASER THROUGH REFERENCE DISPLAY AND TRANSPARENT DISPLAY TO PAINT EXTERNAL ALIGNMENT TARGET — 902

WITH LASER ACTIVE, MOVE REFERENCE DISPLAY TO CENTER LASER BEAM ON RETICLE, ESTABLISHES ALIGNED POSITION OF RETICLE. RETICLE SERVES AS REAR AIM SIGHT — 904

WITH LASER CENTERED ON RETICLE, APPLY VISIBLE MARKER ON TRANSPARENT DISPLAY WHERE LASER BEAM STRIKES/INTERSECTS TRANSPARENT DISPLAY. VISIBLE MARKER SERVES AS FRONT AIM SIGHT. FRONT AND REAR AIM SIGHTS ARE NOW PRE-ALIGNED — 906

FIG.9

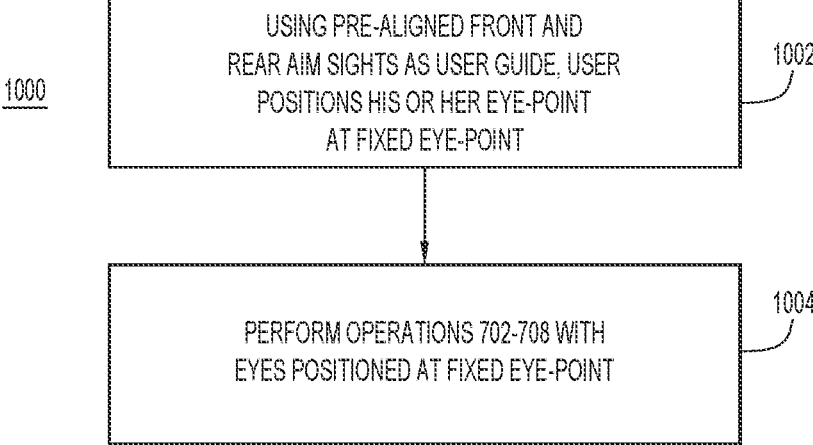

1000

USING PRE-ALIGNED FRONT AND REAR AIM SIGHTS AS USER GUIDE, USER POSITIONS HIS OR HER EYE-POINT AT FIXED EYE-POINT — 1002

PERFORM OPERATIONS 702-708 WITH EYES POSITIONED AT FIXED EYE-POINT — 1004

FIG.10

OPTICAL ALIGNMENT METHOD AND SYSTEM FOR TRANSPARENT DISPLAYS TO OVERCOME PARALLAX

TECHNICAL FIELD

The present disclosure relates generally to systems and methods of parallax-free viewing on a vehicle.

BACKGROUND

An aircraft pilot relies on situational/mission awareness information presented on a display device. Aircraft and vehicle displays include head-down displays that are mounted in an aircraft or vehicle instrument panel, as well as head-up displays that provide information when an operator looks through the aircraft or vehicle window or windscreen. Head-up display information may include graphic objects and camera or sensor video along a line-of-sight of the pilot, while not obscuring an external (real-world) scene viewed by the pilot through a canopy or windscreen. This can be achieved using a "head-up and eyes-out" display arrangement; however, traditional optical systems introduce undesired optical misalignment between the graphic objects and external objects of interest in the external scene due to parallax, which may result in pilot confusion and misidentification of the external objects.

Traditional aircraft head-up displays (HUDs) are bore-sighted to the aircraft axes to align the HUD imagery with the external scene, and HUDs employ collimating display optics to cause the HUD imagery to appear at roughly the same distance as the external scene, and without parallax, so that the seated pilot may move his or her head position from side-to-side or up-and-down. Major drawbacks of traditional collimating HUDs include the use of bulky and restrictive physical equipment, high power consumption, limited fields of view, and high costs. Additional limitations of conventional HUDs is that they are either fixed to the head of the pilot or situated near the eyes of the pilot to avoid parallax, which reduces implementation flexibility.

BRIEF DESCRIPTION OF THE DRAWINGS

FIG. 9 shows example operations performed in the alignment stage.

FIG. 10 is a flowchart of an example method of parallax-free viewing of an external scene using pre-aligned front and rear sights during a post-alignment stage of the non-fixed eye-point embodiment.

DESCRIPTION

Overview

In an embodiment, a method is performed using a transparent display alignment system in a vehicle. The transparent display alignment system includes a transparent display through which eyes of a user behind the transparent display view an external scene in front of the transparent display. The method receives an eye position of the eyes, a vehicle position for the vehicle, and an external object position of an external object in the external scene, and computes a parallax-free position on the transparent display that intersects with a line-of-sight from the eye position to the external object position through the transparent display, at least based on the eye position, the vehicle position, and the external object position. The method positions a graphic object on the transparent display at the parallax-free position to align the eye position, the graphic object, and the external object to avoid parallax when the eyes view the external object through the transparent display.

In another embodiment, a method of parallax-free viewing in a vehicle is provided. The method provides a transparent display through which eyes of a user in the vehicle, positioned behind the transparent display, view an external scene in front of the transparent display. The method provides aim sights that are spaced-apart from each other to serve as an eye-alignment guide for moving the eyes to a fixed eye position behind the transparent display to provide the parallax-free viewing in a field-of-view (FOV) of the external scene from the fixed eye position. The method computes a parallax-free position on the transparent display that intersects with a sight-line from the fixed eye position to an external object in the FOV, through the transparent display, and positions a graphic object on the transparent display at the parallax-free position to avoid parallax when the external object is viewed through the transparent display from the fixed eye position.

EXAMPLE EMBODIMENTS

Figure 1:
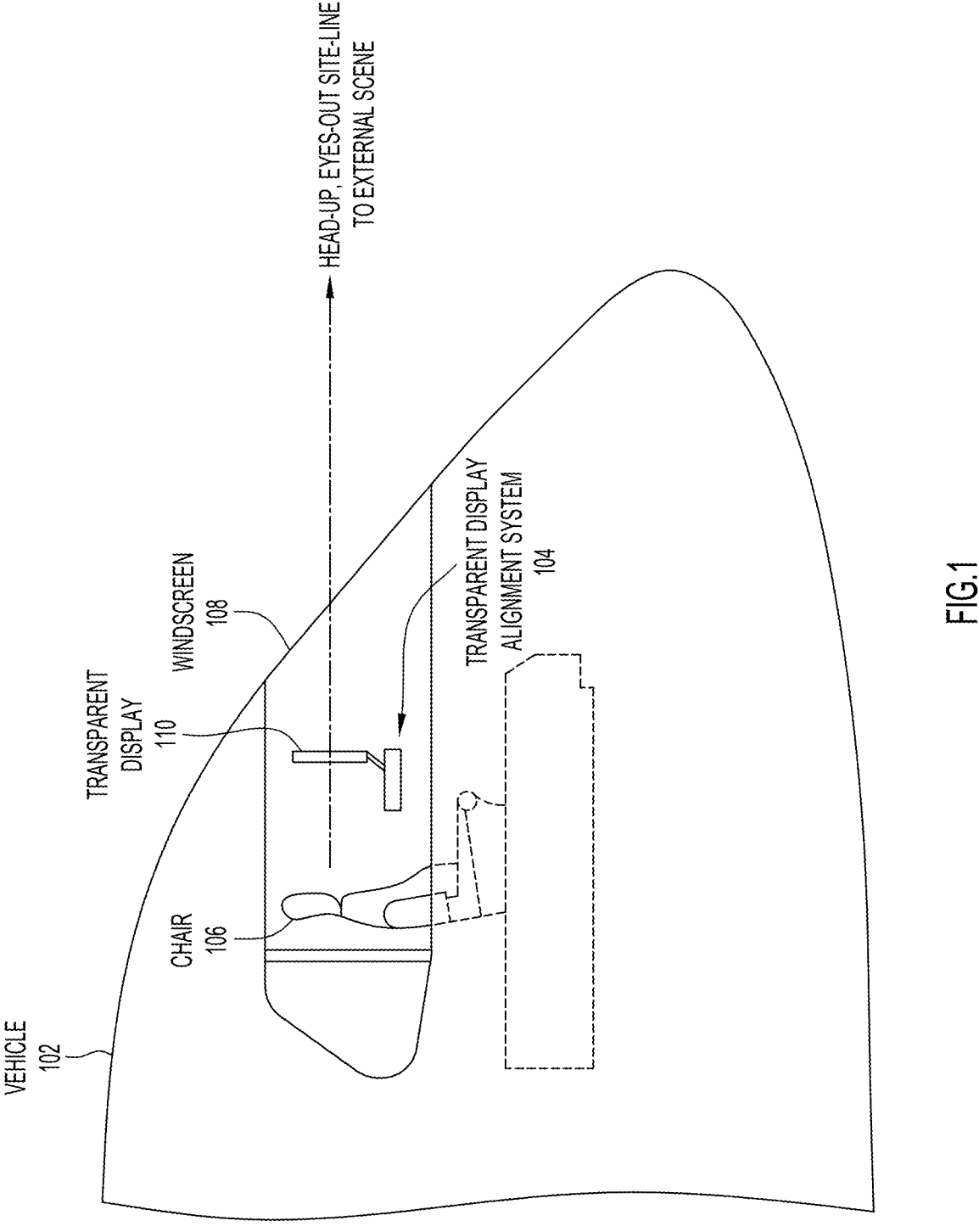
FIG. 1 is an illustration of an example transparent display alignment system (also referred to as an "optical alignment system") deployed in a vehicle for parallax-free viewing of external scenes outside of the vehicle.

FIG. 1 is an illustration of an example vehicle 102 in which a transparent display alignment system 104 (also referred to as an "optical alignment system") that overcomes parallax is deployed according to embodiments presented herein. The vehicle 102 may be any type of vehicle, such as an aircraft (e.g., an airplane, a helicopter, and the like) as depicted in FIG. 1, a ground vehicle, or any other type of vehicle, for example. The vehicle 102 includes a seat or chair 106 in a cockpit of the vehicle to seat a user, and a front windscreen 108 in front and spaced-apart from of the chair. The transparent display alignment system 104 includes a transparent display 110 fixed in position between the chair and the windscreen. That is, the transparent display 110 is situated in front of the user when seated, and the windscreen 108 is positioned in front of the transparent display. In the depicted arrangement, the user looks or gazes through the transparent display 110 and the windscreen 108 to view an external (real-world) scene in front of the windscreen in a head-up and eyes-out arrangement. While the transparent display 110 is fixed in position to vehicle 102, the transparent display is not fixed to the head of the user (i.e., is physical detached from the user), which enables the user to move his or head freely relative to the transparent display. Moreover, the transparent display 110 may be positioned a relatively far distance from the head, and the distance can vary while maintaining parallax-free viewing as described herein. For example, the transparent display 110 may be adjacent to or integrated with the windscreen.

To increase situational awareness in mission environments, the transparent display alignment system 104 presents visible graphic objects, images, text, video, symbols, shaded regions, shapes, lines, and the like (generally referred to as "graphic objects") on the transparent display 110 along the line-of-sight (i.e., sight-line) of the user, while not obscuring the external view seen through the windscreen 108. From the perspective of the user, the graphic objects augment the external scene (i.e., present an augmented reality (AR) scene) when viewed through the transparent display 110. The transparent display alignment system 104 positions the graphic objects on the transparent display 110 so that user sight-lines to the external objects intersect or nearly intersect with the graphic objects on the transparent display to avoid parallax between the eyes of the user (i.e., the user's eyes), the graphic objects, and the external objects.

The transparent display alignment system 104 presented herein includes two main embodiments. The two main embodiments include a fixed eye-point embodiment and a non-fixed eye-point embodiment (also referred to as an "eye-tracker" embodiment). The two embodiments include overlapping or common components and perform similar operations to achieve similar goals, except as described below. The embodiments eliminate the parallax effect without the use of collimating display optics, while simultaneously increasing the field-of-view, and reducing the size, weight, power, and cost versus traditional collimating HUDs. In addition, the embodiments enable the use of, or viewing through, the entire window or windscreen as the "HUD" display surface with minimal parallax, which may not be achievable with traditional collimating HUDs. Advantageously, the embodiments are not fixed to the head of the pilot and need not be situated near the eyes of the user to avoid parallax, which increases implementation flexibility over traditional approaches.

Figure 2:
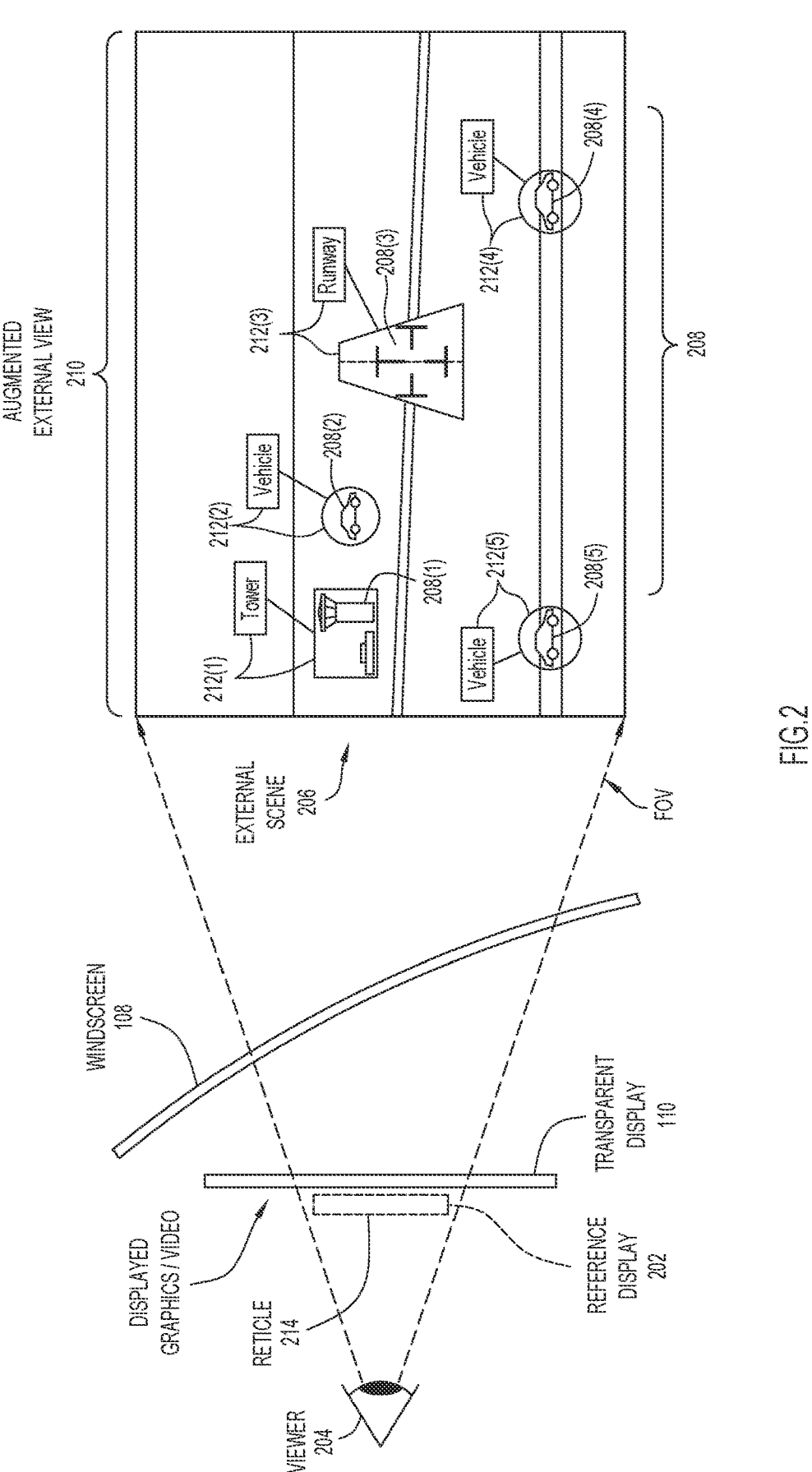
FIG. 2 shows an example concept of operation of the transparent display alignment system.

FIG. 2 shows a concept of operation of the transparent display alignment system 104. FIG. 2 shows the windscreen 108 at a first fixed position, the transparent display 110 installed/mounted at a known second fixed position that is spaced-apart from and behind the windscreen, a reference display 202 (only used in the fixed eye-point embodiment) of the transparent display alignment system 104 installed/mounted at a known third fixed position that is spaced-apart from and behind the transparent display, and eyes 204 of the user (also referred to as the "viewer") at a fourth position that is spaced-apart from and behind the transparent display. Another arrangement reverses the positions of the transparent display 110 and the reference display 202 such that the transparent display is behind the reference display.

As used herein, the position of the eyes (i.e., the eye position) is also referred to as an "eye-point." The eyes 204 look through the transparent display 110 and the windscreen 108 to view an external scene 206 that falls in a field-of-view (FOV) that is in front of the windscreen. The external scene 206 includes external objects 208(1)-208(5) (collectively referred to as "external objects 208") that may be selected or designated as external objects of interest to the viewer.

The transparent display alignment system 104 creates an AR external view 210 of the external scene 206 as viewed through the transparent display 110. More specifically, the transparent display alignment system 104 generates graphic objects 212(1)-212(5) (collectively referred to as "graphic objects 212") for corresponding ones of the external objects 208(1)-208(5), and displays the graphic objects on the transparent display 110 adjacent to or overlapping with the corresponding ones of the external objects. In the example of FIG. 2, the graphic objects include color-coded shapes and text corresponding to the different types of the external objects 208. To avoid parallax issues, the transparent display alignment system 104 positions the graphic objects 212 on the transparent display 110 where sight-lines from the eyes 204 to the external objects 208 intersect the transparent display. In this way, the transparent display alignment system 104 aligns the eyes 204, the graphic objects 212, and the external objects 208 along the sight-lines to avoid parallax between the eye, the graphic objects, and the external objects as viewed through the transparent display. In the absence of parallax-free positioning of the graphic objects 212 as presented herein, as the user moves his or her viewing position, the graphic objects 212 also move relative to, and become offset with respect to, corresponding ones of the external objects, which disrupts accurate correlation of the graphic objects to the external objects.

As presented herein, the transparent display 110 provides a viewable, transparent display screen surface for the display of video/graphics information to supplement or augment an external scene that is viewed through the transparent display. The transparent display 110 may utilize multiple known or hereafter developed transparent display technologies that include, but are not limited to, transparent liquid crystal displays (LCDs), transparent light emitting diode (LED) displays, organic LED (OLED) displays, transparent micro-LED displays, synthetic light field displays, and a variety of transparent projection displays. The transparent display 110 may be a standard two-dimensional (2D) display or a three-dimensional (3D) or holographic/pseudo-holographic display. The reference display 202 may utilize similar display technologies as the transparent display 110 as well as other known technologies such as holograms, two-layer active or non-active displays with physical separation between the layers, or collimated fiber optics displays that provide a visible color or other attribute to indicate the user is at the correct viewing point.

In the fixed eye-point embodiment, the reference display 202 includes a reticle 214 and the transparent display 110 presents a visible marker (not shown in FIG. 2) that together serve as aim sights to guide the eyes of the user to a correct "fixed" eye position behind the transparent display. Viewing the external scene through the transparent display 110 from the fixed eye position eliminates parallax. That is, the graphic objects on the transparent display 110 will be correctly aligned with the fixed eye position and the external scene when viewed from the fixed eye position. The fixed eye-point embodiment is described below in connection with FIGS. 8A-12.

In contrast, the non-fixed eye-point embodiment tracks a "tracked" position of the eyes 204 (i.e., a tracked eye position) that can move relative to the transparent display 110, and then automatically positions (and repositions) the graphic objects 212 on the transparent display in real-time to align the graphic objects on the transparent display, the external scene 206, and the tracked eye position to each other, as the tracked eye position moves. This enables the tracked position of the eyes to move relative to the transparent display while maintaining parallax-free viewing of the external scene.

Figure 3:
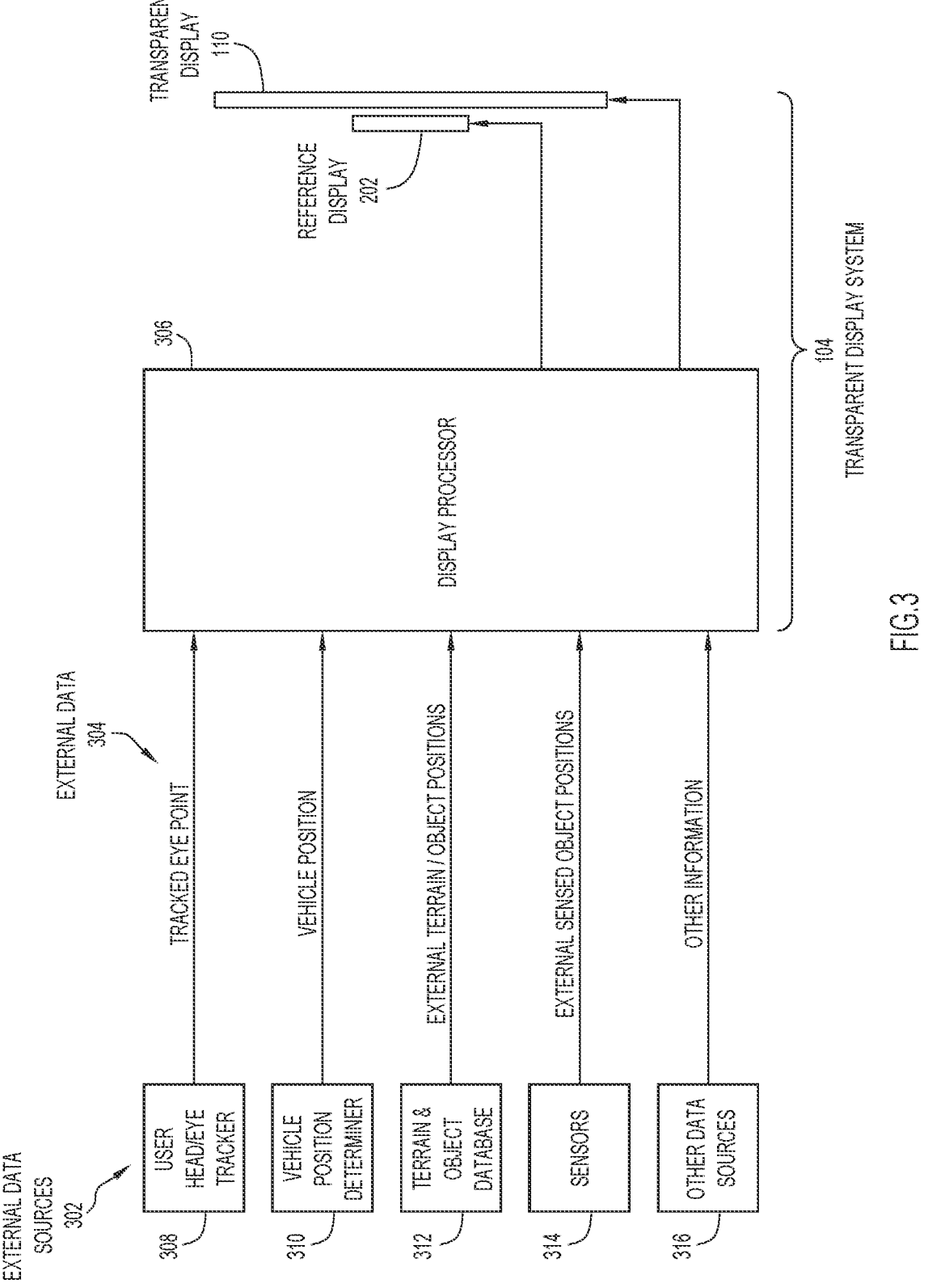
FIG. 3 is a block diagram of the transparent display alignment system integrated with example external data sources on the vehicle.

FIG. 3 is a block diagram of the transparent display alignment system 104 integrated with external data sources 302 on the vehicle 102. The external data sources 302 generate external data 304 (mainly position information) used by the transparent display alignment system 104. As shown in FIG. 3, the transparent display alignment system 104 includes the transparent display 110, the reference display 202 (only used in the fixed eye-point embodiment), and a display processor 306 (also referred to as a "controller") configured to control the transparent display and the reference display based on the external data. The external data sources 302 are implemented as known data sources. The external data sources 302 include an eye tracker system 308 (only used in the non-fixed eye-point embodiment), a vehicle position determiner 310, a terrain and object database 312, sensors 314, and other data sources 316.

In the non-fixed eye-point embodiment, the eye tracker system 308 tracks the position of the eyes (i.e., the tracked "eye-point") of the viewer in real-time as the eyes of the viewer move, and provides the tracked eye-point to the display processor 306. The tracked eye-point (position) may include eye tracker coordinates of an eye tracker coordinate system having an origin at a position of an eye sensor of the eye tracker system (not shown), which is installed at a known location on the vehicle 102.

The vehicle position determiner 310 may include one or more of a global positioning system (GPS) receiver, a wide area augmentation receiver (WAAS) GPS receiver, inertial navigation systems, and other supplemental navigation systems, for example. The vehicle position determiner 310 derives a position of vehicle 102 (i.e., a vehicle position) and provides the same to the display processor 306. The vehicle position may include real-world GPS coordinates of the GPS receiver on the vehicle 102, for example. The GPS receiver is installed on the vehicle 102 at a known position.

The terrain and object database 312 provides a matrix of terrain elevation values from sources such as the U.S. Government digital terrain elevation data (DTED) model or other similar commercial sources. The terrain and object database 312 provides a 3D digital model of external terrain, as well as certain fixed objects such as obstructions. The aforementioned terrain and object data is currently used for synthetic vision displays, 3D terrain modeling, and other applications, for example. The display processor 306 accesses the terrain and object data from the terrain and object database 312. The terrain and object data may include real-world coordinates (e.g., latitude, longitude, and height (Z)) for external terrain and objects.

The sensors 314 may include one or more of light detection and ranging (LIDAR), light-field, electro-optical, time-of-flight, and radar sensors, for example, mounted on the vehicle 102. The sensors 314 provide to the display processor 306 sensed data (i.e., sensor data) for terrain and objects in the external scene, such as point-cloud data, and external object position. In some implementations sensor data from multiple sensors may be combined into "fused" sensor data. Sensed position may include range, azimuth, and elevation with an origin at whichever sensor produces the sensed position.

Other data sources 316 may include satellite or radio communications links, local/remote and/or cloud-based data repositories, aircraft or vehicle sensors, identification, friend or foe (IFF) systems, and targeting systems, for example. The other data sources 316 provide to the display processor 306 information associated with object positions and supplemental information that is not object related, such as weather information, flight instrumentation, and line-of-sight information, for example. As an example, the display processor 306 may receive from an Automatic Dependent Surveillance-Broadcast (ADS-B) transponder identification, position, altitude, and velocity of nearby air traffic to be displayed on the transparent display 110 along the sight-line to the actual external traffic.

As described above, the external data sources 302 generate the external data 304 with respect to different 3D coordinate systems. The display processor 306 transforms positions conveyed in the external data 304, the position of the transparent display 110, and the position of the reference display 202 (for the fixed eye-point embodiment), to a common 3D reference coordinate system (referred to more simply as a "common coordinate system (CCS)"), as described below in connection with FIG. 4.

Figure 4:
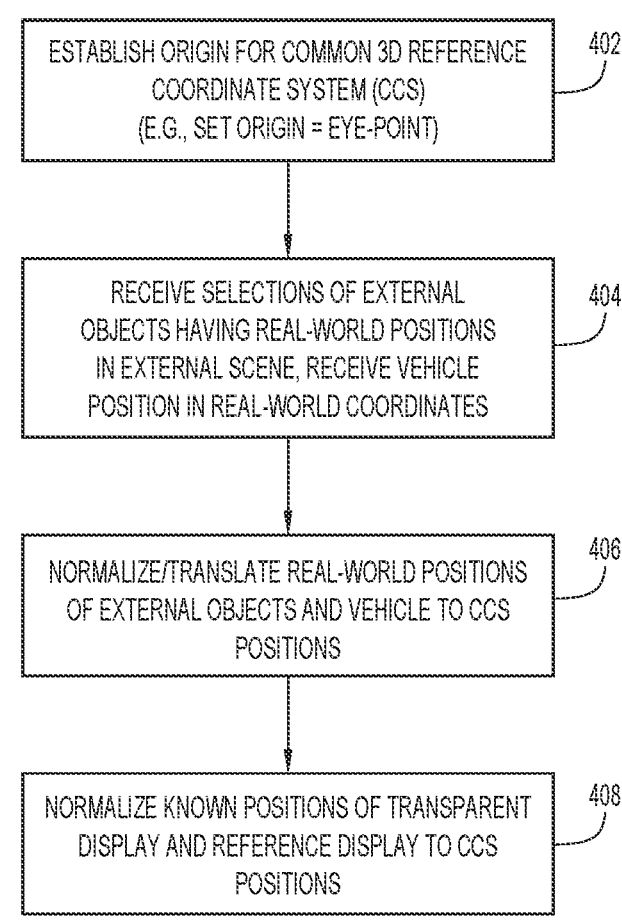
FIG. 4 is a flowchart of an example method of transforming positions of eyes of a user in the vehicle, the vehicle, external objects, and a transparent display of the transparent display alignment system from their native coordinate systems to a common three-dimensional reference coordinate system for the parallax-free viewing.

FIG. 4 is a flowchart of an example method of transforming the positions to the CCS.

At 402, the display processor 306 establishes an origin for the CCS (e.g., P(x,y,z)). In an example, the origin is the eye-point. For the fixed eye-point embodiment, a fixed eye-point for the viewer may be predetermined, as discussed below. For the non-fixed eye-point embodiment, a non-fixed eye-point is returned by the eye tracker system 308 as a tracked eye-point, which may vary as the viewer moves.

At 404, the display processor 306 receives selections of external objects of interest in the external scene. The selections may be made by a user through a user device or interface, such as graphical user interface (GUI), coupled with the display processor 306. Alternatively, the selection may be made by the display processor 306 automatically based on external inputs, system algorithms, and other data inputs.

At 406, the display processor 306 performs position coordinate normalization on the external objects as selected. More specifically, the display processor 306 normalizes the positions of the external objects and the vehicle position from their respective real-world positions as presented in the external data to corresponding positions in the CCS (e.g., P(x, y, z)). As mentioned above, the real-world positions of the external objects may be in various formats, such as (i) latitude and longitude, (ii) range, azimuth, and bearing, (iii) GPS coordinates, and so on, depending on the external source. The positions of the external objects and the vehicle in the CCS are referenced to the origin, e.g., the eye-point.

At 408, the display processor 306 normalizes the positions of the transparent display 110 and the reference display 202 from their respective known positions on the vehicle 102 to the CCS, e.g., relative to the eye-point.

In summary, method 400 normalizes positions of external terrain/objects, the vehicle 102, the transparent display 110, and the reference display 202 to the CCS whose origin is the eye-point of the viewer. In both the fixed eye-point and non-fixed eye-point embodiments, the display processor 306 employs the normalized positions to compute positions on the transparent display 110 for placement of graphic objects in order to avoid parallax between the eye-point, the graphic objects, and the external objects that correspond to the graphic objects.

Figure 5A:
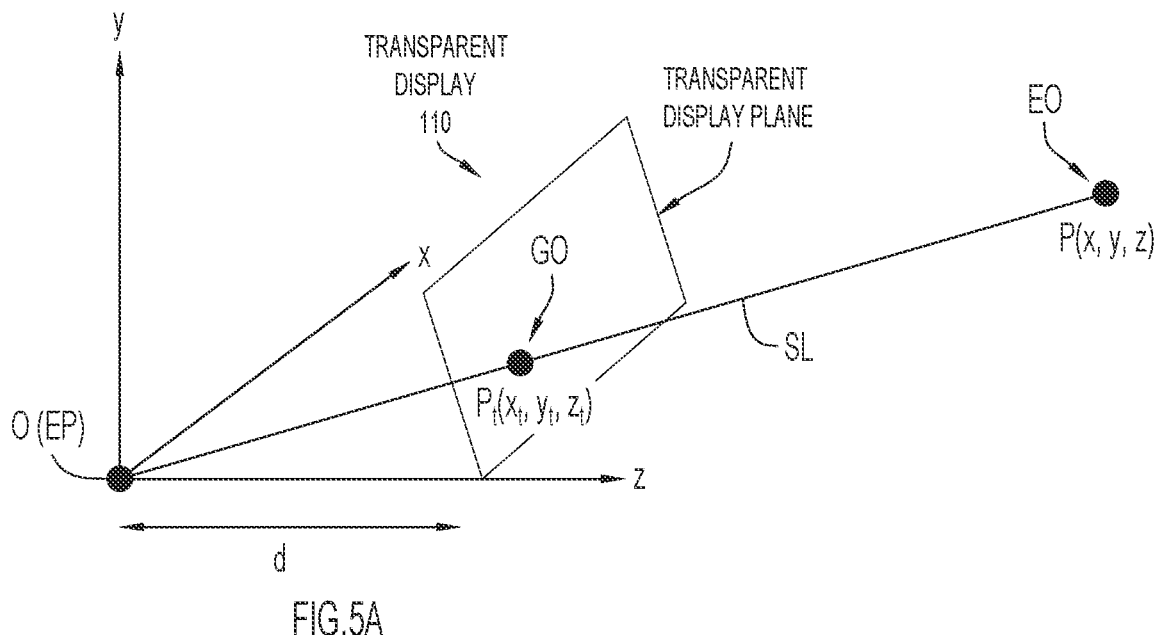
FIGS. 5A, 5B, and 5C are illustrations of example operations performed by a display processor (or "controller") of the transparent display alignment system to position a graphic object for an external object on the transparent display to avoid parallax.
Figure 5B:
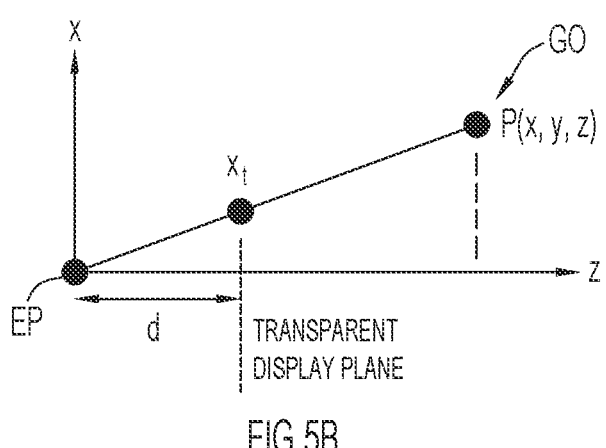
Figure 5C:
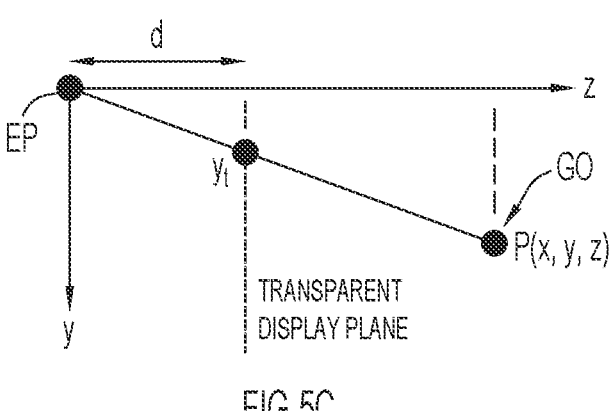

FIGS. 5A, 5B, and 5C are illustrations of operations performed by the display processor 306 to position a graphic object for an external scene on the transparent display to avoid or overcome parallax. FIG. 5A shows a known eye-point EP at an origin O of the CCS, an external object EO having a known external object position P(x, y, z) in the CCS, and the transparent display 110 positioned a known distance d from the eye-point EP along a z-axis of the CCS. The goal is to display a graphic object GO corresponding to the external object EO on the transparent display 110 to avoid parallax with respect to the user. To avoid parallax, the display processor 306 computes an imaginary straight-line SL (which represents a sight-line) from the eye-point EP to the external object position P(x, y, z) through a transparent display plane of the transparent display 110. The sight-line intersects the transparent display plane at an intersection point $P_t(x_t, y_t, d)$ in the CCS, which represents a parallax-free position for placement of the graphic object GO on the transparent display.

FIGS. 5B and 5C are illustrations of operations performed by the display processor 306 to compute the intersection point $P_t(x_t, y_t, d)$ on the transparent display plane, based on all of the above-mentioned known positions. Using similar triangles, the display processor 306 computes coordinate $x_t = d \cdot x/z$, and coordinate $y_t = d \cdot y/z$. Then, the display processor 306 normalizes and translates the coordinates $x_t$, $y_t$ to on-screen pixel coordinates for the transparent display, and positions the graphic object GO on the transparent display 110 at the on-screen pixel positions. This aligns the eye-point EP, the graphic object GO, and the external object EO along the sight-line to avoid parallax.

The above-described operations may be employed in both the fixed eye-point and the non-fixed eye-point embodiments to avoid parallax, the only difference being that the non-fixed eye-point embodiment uses the tracked position received from the eye tracker system 308, while the fixed eye-point embodiment uses a predetermined fixed eye-point, always.

Figure 6:
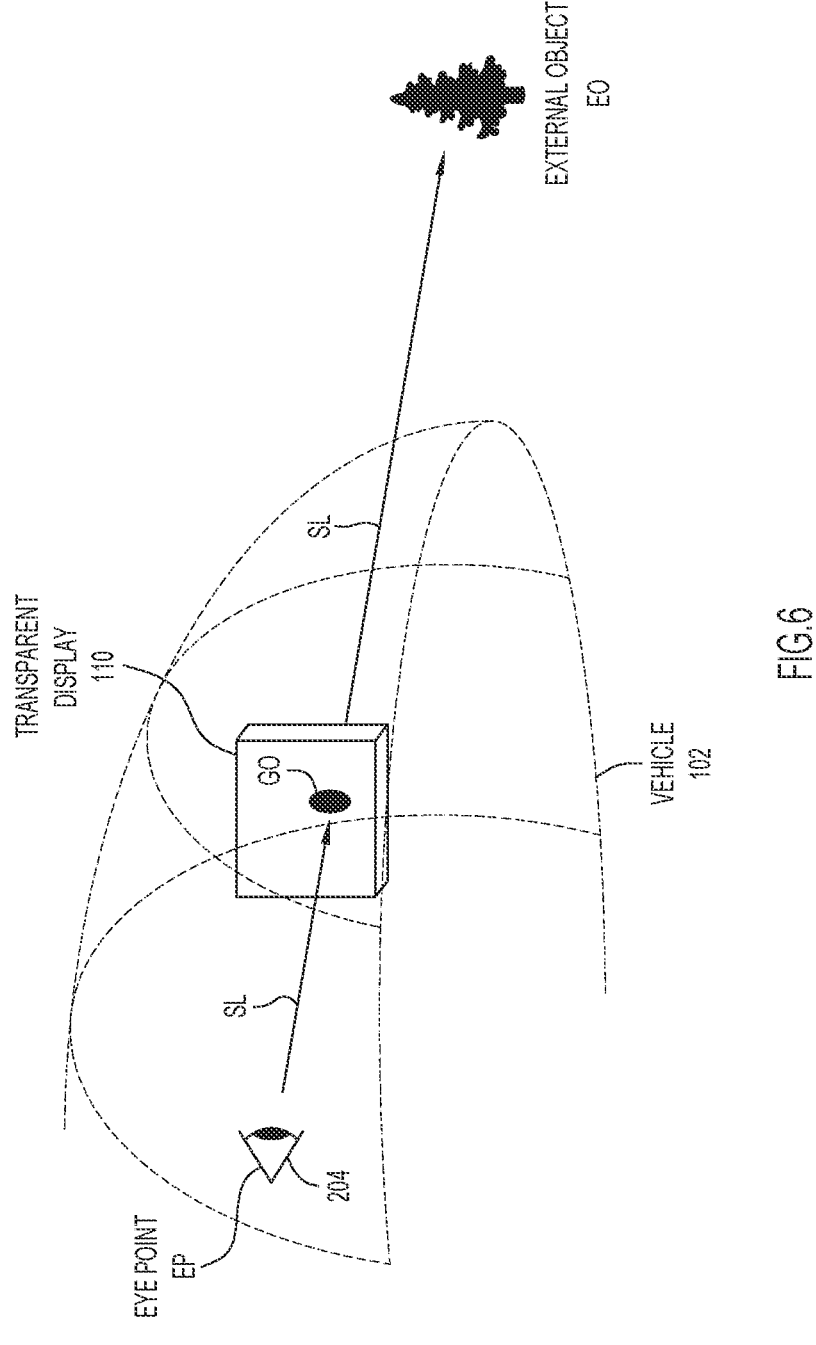
FIG. 6 shows an example of parallax-free viewing of the external object from inside the vehicle that results from the operations of FIGS. 4 and 5A-5C.

FIG. 6 shows parallax-free viewing of external object EO from inside the vehicle that results from the above-described operations. As shown, the operations place the graphic object GO on the transparent display 110 at the parallax-free position along the sight-line SL, such that the eye-point EP, the graphic object, and the external object EO lie on the sight-line.

Figure 7:
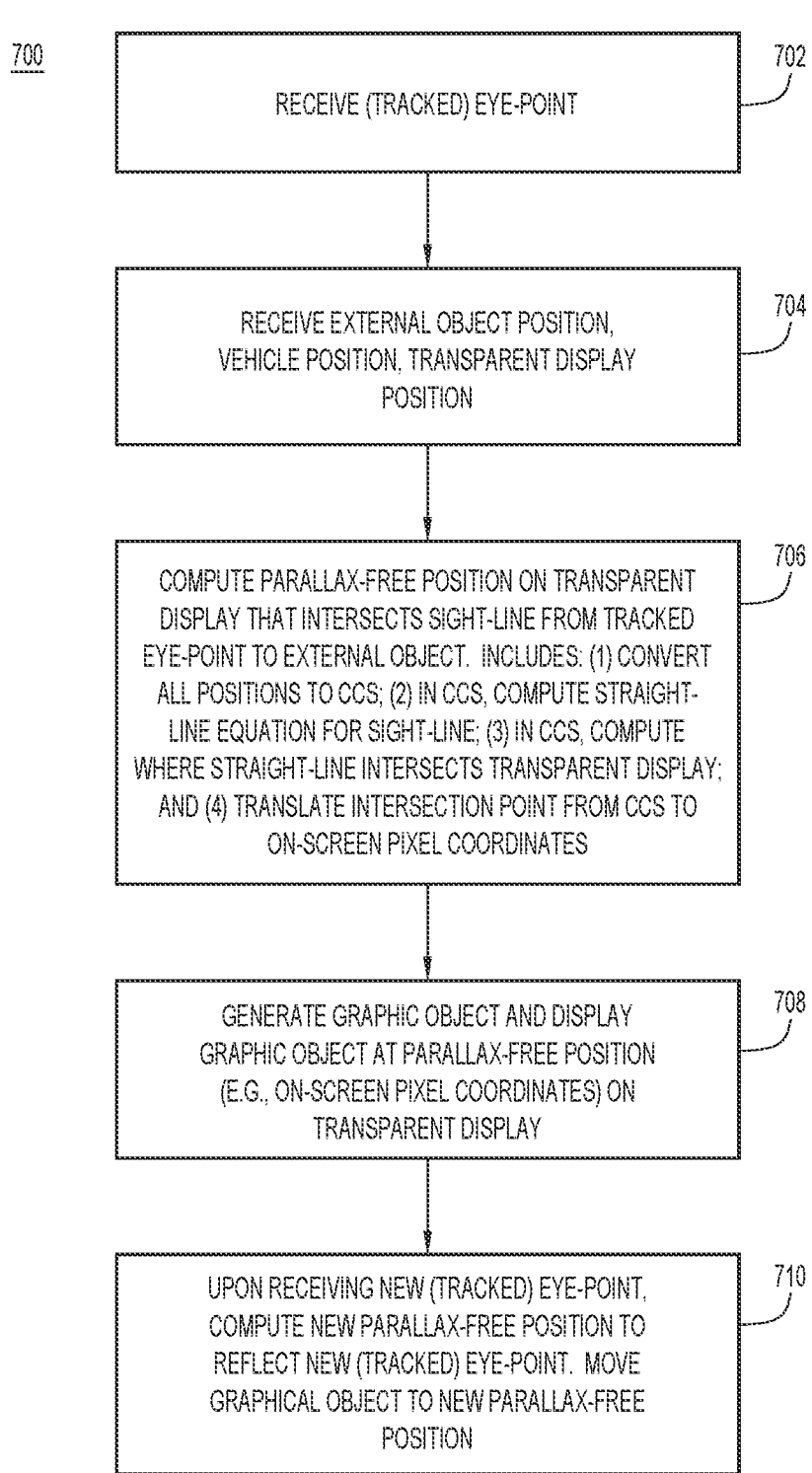
FIG. 7 is a flowchart of an example method of achieving parallax-free viewing in a non-fixed eye-point embodiment.

FIG. 7 is a flowchart of an example method 700 of achieving parallax-free viewing in the non-fixed eye-point embodiment. Method 700 may be performed by the transparent display alignment system 104 in the vehicle 102. The transparent display alignment system 104 includes the transparent display 110 through which the user positioned in the vehicle behind the transparent display is able to view an external scene in front of the transparent display. The transparent display 110 is not fixed to the head of the user. It is understood that some vehicle (e.g., aircraft) mounted sensors, such as cameras, will be boresighted such that the camera imagery is aligned with a known viewing angle with the vehicle axes.

At 702, the display processor 306 receives an eye position/eye-point (i.e., a tracked eye-point) from the eye tracker system 308.

At 704, the display processor 306 receives a selection of an external object in an external scene in front of the windscreen 108, and receives a position of the external object (i.e., an external object position). For example, the display processor 306 may receive the external object position from the sensors 314, the terrain and object database 312, and so on. The display processor 306 also receives a position of the vehicle 102 (i.e., a vehicle position), and accesses a known position of the transparent display 110 (i.e., a transparent display position).

At 706, the display processor 306 computes a parallax-free position on the transparent display 110 (e.g., on-screen pixel coordinates) (also referred to as a "parallax-free display position") that intersects with a sight-line from the eye-point to the external object position through the transparent display, based on the positions received at 704, and as described above in connection with FIG. 3-6. For example, the display processor 306:

a. Normalizes/translates all received positions that are not in the CCS to the CCS.

b. In the CCS, computes an equation of a straight-line that represents a sight-line from the eye-point to the external object that intersects the transparent display 110.

c. In the CCS, computes an intersection position on the transparent display 110 where the sight-line intersects the transparent display. This is the parallax-free display position in the CCS.

d. Translates the intersection position from the CCS to the on-screen pixel coordinates.

At 708, the display processor 306 generates a graphic object and positions the graphic object on the transparent display 110 (i.e., controls the transparent display to display the graphic object) at the parallax-free position on the transparent display (e.g., the on-screen pixel coordinates) to align the eye-point, the graphic object, and the external object (position) along the sight-line to avoid parallax when the eyes of the user view the external object through the transparent display. This may be referred to as positioning the graphic object on the transparent display at the parallax-free position.

At 710, upon receiving a new eye-point (i.e., a new tracked eye-point) from the eye tracker system 308 that differs from the original eye-point from 702 responsive to movement of the user relative to the transparent display 110, the display processor 306 computes a new parallax-free display position that differs from the original parallax-free display position of 706 to reflect the new eye-point. The display processor 306 moves or repositions the graphic object to the new parallax-free display position to maintain parallax-free viewing of the external object from the new eye-point through the transparent display.

Figures 8A, 8B:
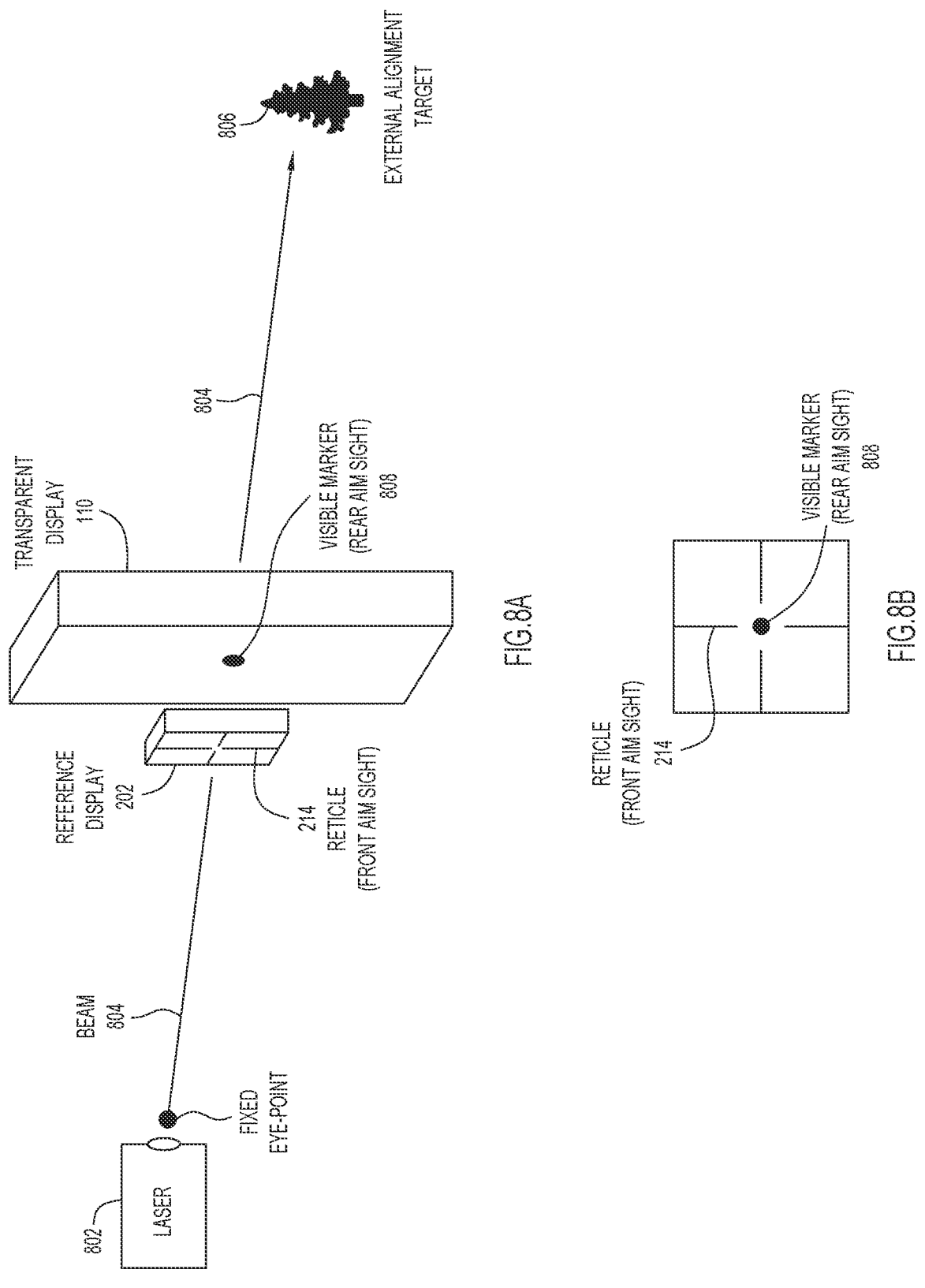
FIGS. 8A and 8B are a side view and a front view of various components employed for an alignment stage of a fixed eye-point embodiment.

The fixed eye-point embodiment is described below in connection with FIGS. 8A-12. As shown in FIG. 8A, the transparent display alignment system 104 for the fixed-point embodiment also includes the reference display 202 mentioned above, but omits the eye tracker system 308. The fixed eye-point embodiment operates in two stages, including:

a. An initial alignment or boresighting stage (during which the user is not involved) to pre-align the fixed eye-point, the reticle 214 of the reference display 202, and a visible marker (described below) on the transparent display 110 along a sight-line from the fixed eye-point to a limited FOV of an external scene.

b. A post-alignment stage that provides parallax-free viewing to the user from the fixed eye-point to an external scene based on the pre-aligned reference display and transparent display markers.

FIGS. 8A and 8B are a side view and a front view of various components employed for the initial alignment stage of the fixed eye-point embodiment. It is understood that some vehicle (e.g., aircraft) mounted sensors, such as cameras, will be boresighted such that the camera imagery is aligned in a known viewing angle with the vehicle axes. Likewise, transparent display 110 and reference display 114 are aligned in a known viewing angle with the vehicle axes. In an alignment example, as shown in FIG. 8A, the alignment stage employs a laser 802 to generate a laser beam 804, the reference display 202, the transparent display 110, and an external alignment target 806 that falls into a limited FOV in front of the windscreen 108. The reference display 202 includes reticle 214 (also referred to as a "front aim sight") presented on the reference display. The transparent display 110 includes a visible marker 808 (also referred to as a "rear aim sight"), described below in connection with FIG. 9. In another arrangement, the positions of the reference display 202 and the transparent display may be reversed.

FIG. 9 shows operations 900 performed in the alignment stage using the arrangement of FIGS. 8A and 8B.

At 902, an operator positions the laser 802 at a fixed eye-point. The fixed eye-point may be an average expected eye position for the user when seated in the chair 106 during the post-alignment stage. The fixed eye-point is stored by the display processor 306 for subsequent access during the post-alignment stage. The laser 802 shoots/fires the laser beam 804 through the reference display 202, the transparent display 110, and onto the external alignment target 806. The laser beam 804 paints a visible laser dot on the external alignment target 806. The path of the laser beam 804 simulates a sight-line from the fixed eye-point through the reference display 202 and the transparent display 110 to the external alignment target 806.

With the laser beam 804 active, at 904, the operator moves the reference display 202 relative to the laser beam into a position (referred to as an "aligned position") of the reference display at which the laser beam is centered on the reticle 214. The reference display 202 is fixed at the aligned position. The reticle 214 presented on the reference display 202 represents the front aim sight of the transparent display alignment system 104 relative to the fixed eye-point.

With the laser beam 804 active, and with the reference display 202 in the aligned position, at 906, the operator applies to the transparent display 110 visible marker 808 (e.g., a circle) at a point on the transparent display where the laser beam intersects the transparent display. The visible marker 808 presented on transparent display 110 represents the rear aim sight of the transparent display alignment system 104 relative to the fixed eye-point. The visible marker 808 may be a physical marker or marking that is patterned (e.g., painted or otherwise affixed) on the transparent display. Alternatively, the visible marker 808 may be a virtual marker that takes the form of a graphic object (e.g., an aim-sight graphic) generated by the display processor 306 and displayed on the transparent display 110. In the latter case, the display processor 306 stores an on-screen position for the visible marker 808, for subsequent generation of the visible marker at the on-screen position during the post-alignment stage.

Operation 906 aligns the fixed eye-point, the reticle 214 (e.g., the front aim sight), the visible marker 808 (e.g., the rear aim sight), and the external alignment target 806 along the sight-line that extends from the fixed eye-point to the FOV that includes the external alignment target 806. That is, operation 906 pre-aligns the front aim sight, the rear aim sight, and the fixed eye-point for parallax-free viewing of an external scene by the user during the post-alignment stage.

FIG. 10 is a flowchart of an example method 1000 of parallax-free viewing of an external scene by the eyes of the user using the pre-aligned front and rear aim sights (collectively referred to as the "pre-aligned aim sights") during the post-alignment stage of the non-fixed eye-point embodiment. The method provides/uses a transparent display and pre-aligned aim sights. As mentioned above, prior to performing method 1000, the aim sights are aligned, to produce the pre-aligned aim-sights. The pre-aligned aim sights are spaced-apart from, and aligned with, each other to serve as an eye-alignment guide for moving the eyes to the fixed eye position behind the transparent display for the parallax-free viewing across a limited FOV of the external scene. Viewing within the limited FOV ensures the parallax-free viewing.

At 1002, using/with the aid of the pre-aligned aim sights, the user positions his or her eyes at the fixed eye-point. To do this, the user moves his or her eyes to the fixed eye-point such that the pre-aligned aim sights coincide with each other (i.e., are aligned with each other) along a sight-line from the fixed eye-point (now the eyes of the user) through the pre-aligned aim sights (including the transparent display) to an external scene in front of the windscreen. This is akin to aligning front and rear gun sights on a distant target. The user maintains his or her eyes at the fixed eye-point for subsequent operations of the post-alignment stage.

At 1004, the method performs operations 702-708 described above in connection with the non-fixed eye-point embodiment, except that the method uses the fixed eye-point instead of a varying tracked eye-point for operations 702-708. Operation 1004 generates a graphic object and displays the graphic object on the transparent display 110 at a parallax-free display position that aligns the fixed eye-point, the graphic object, and the external object along the sight-line to avoid parallax when the user views the external object through the transparent display from the fixed eye-point.

Figure 11:
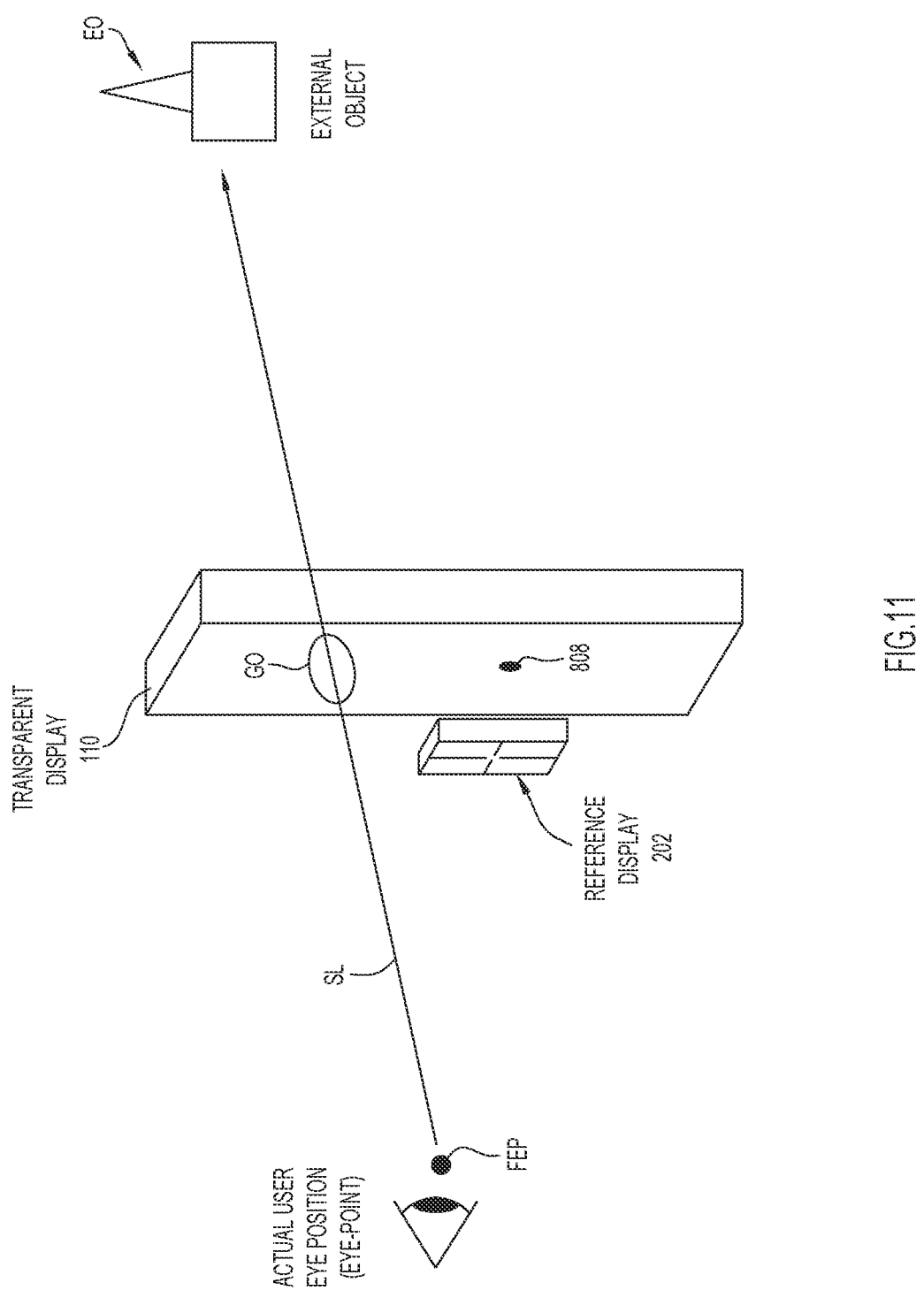
FIG. 11 is an illustration of parallax-free viewing performed in the fixed eye-point embodiment during the post-alignment stage.

FIG. 11 is an illustration of parallax-free viewing performed by the user in the fixed eye-point embodiment during the post-alignment stage. FIG. 11 shows fixed eye-point FEP, external object EO, and graphic object GO aligned on sight-line SL from the fixed eye-point to the external object to avoid parallax, as described above. Except to guide positioning/movement of the eyes of the user into the fixed eye position, the pre-aligned front and rear aim sights are not used by the display processor 306 to generate and position the graphic object GO in accordance with operation 702-708 based on the fixed eye-point.

Figure 12:
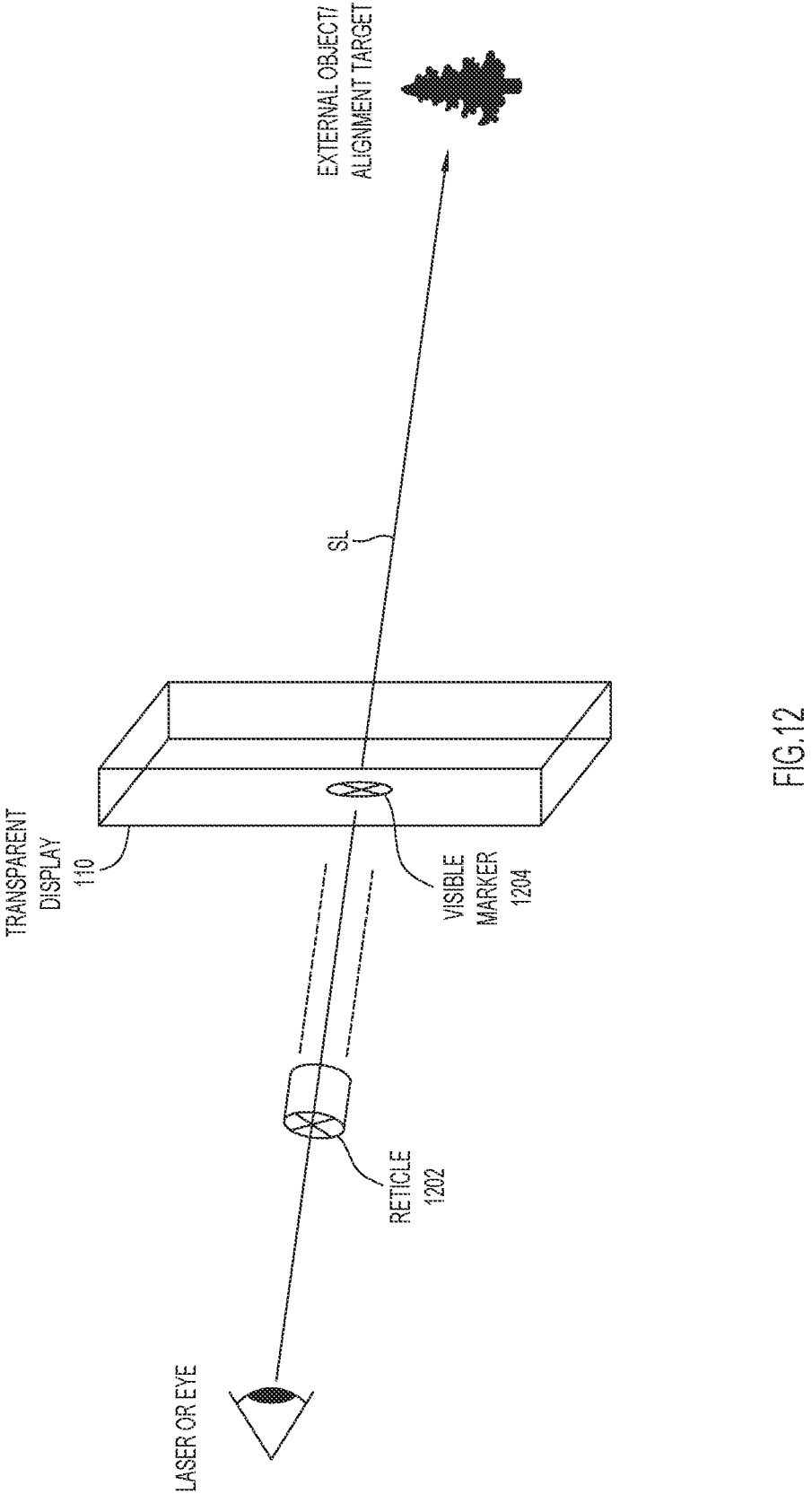
FIG. 12 is an illustration of parallax-free viewing in the fixed eye-point embodiment during the post-alignment stage, using a virtual front and rear aim sights.

FIG. 12 is an illustration of parallax-free viewing in the fixed eye-point embodiment during the post-alignment stage, using a virtual reticle 1202 (e.g., a virtual front aim sight) and a virtual visible marker 1204 (e.g., a virtual rear aim sight) displayed on transparent display 110. In other words, both the front and rear aim sights are presented as graphical objects.

In summary, in the fixed eye-point embodiment, the reference display provides visible markers to allow the user to position his or her eyes at the correct viewing point to eliminate parallax in the augmented external scene. The reference display may utilize similar display technologies as the transparent display as well as other known technologies such as holograms, two-layer active or non-active displays with physical separation between the layers, or collimated fiber optics displays that provide a visible color or other attribute to indicate the user is at the correct viewing point. The reference markers on the reference display are correctly viewed from the designated, fixed user eye point. The reference display is analogous to a gun sight, where for example, a "front sight" marker and a "rear sight" marker are aligned to achieve a proper aiming point. Reticles or other positioning aides may be incorporated into the reference display to aid the user in obtaining and maintaining the optimum viewing position. To ensure the graphic objects on the transparent display conform to reality, where outside/external objects align to the objects/graphics depicted on the transparent display, the transparent display alignment system is initially boresighted so that it is aligned with respect to an axis of the vehicle. Boresighting may be accomplished using an optical or laser boresighter device, as described above.

In some embodiments, the transparent display may be formed by a holographic or pseudo-holographic display in order to provide a perceived 3D image that conveys depth to the user. Holographic displays utilize a variety of implementations that may include lenticular lens and parallax barrier technologies, holographic technologies, light field technologies, and others.

In another embodiment, a 3D graphic may be employed as an aim sight to ensure the eyes are in a parallax-free fixed eye position. The 3D graphic may be configured such that the 3D graphic appears in three dimensions (e.g., as opposed to two dimensions) only when viewed from the correct fixed eye position.

In other embodiments, the transparent display is formed by a synthetic light-field display. The light-field display produces a perceived "3D floating image" with correct perspective and depth cues in the user's line of sight, while viewing the external scene. The light-field image is projected from a synthetic light-field display device, and does not require a fixed eye-point for the viewer since the synthetic light field may be correctly viewed from multiple positions within the bounds of the display device's performance and field of view.

In further embodiments, it is desirable for the transparent display surface to be a curved, (i.e. non-flat), angled surface. An example of this is the use of projection-based transparent display technology where a curved windscreen/window is modified to be used as the transparent display surface. Likewise, a curved transparent display using other technologies such as transparent OLED, may be used to match the contours of an aircraft or vehicle window to provide improved packaging and installation of the invention. With the use of a curved, angled display surface, the on-screen graphics/video from the display processor must be pre-distorted to maintain correct geometry when viewed by the user (e.g., a displayed circle may appear as an ellipse if not pre-distorted to account for the non-flat, angled display surface). The pre-distortion of on-screen graphics/video for correct display presentation will be performed by the display processor utilizing methods that are well-known in the field of computer graphics.

Figure 13:
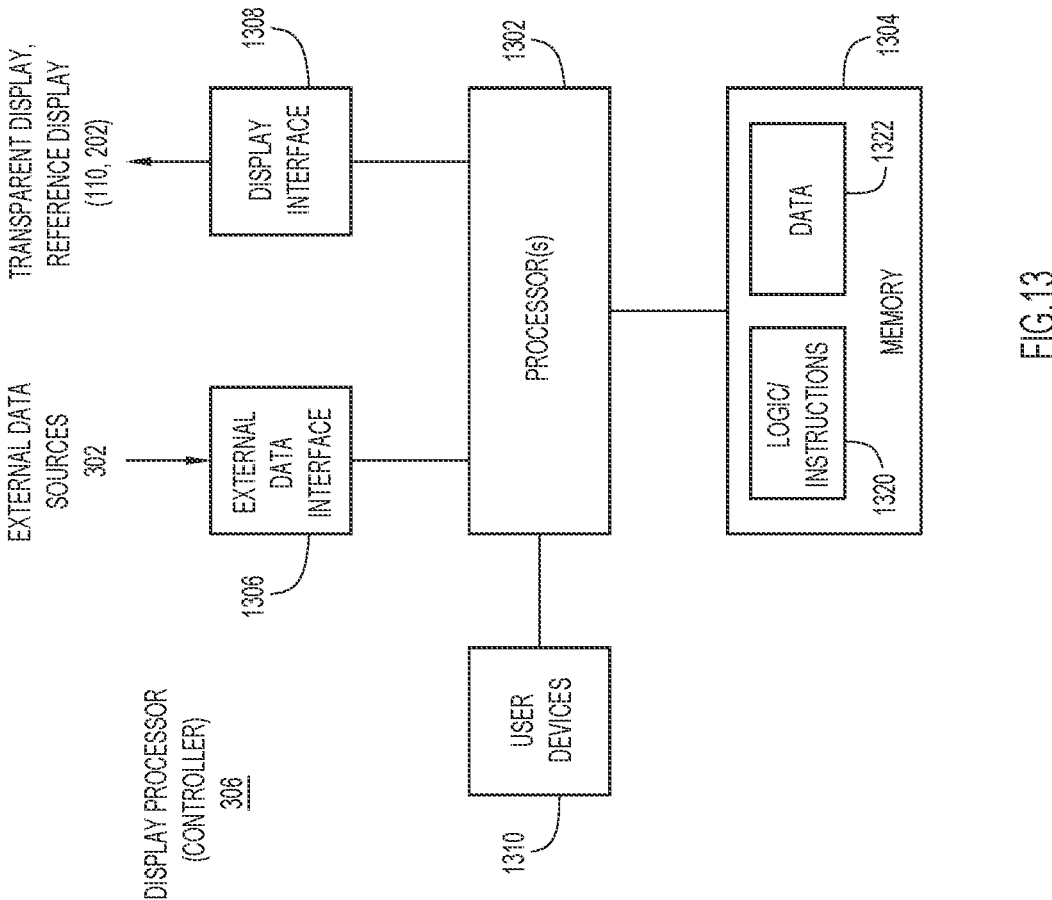
FIG. 13 is a block diagram of an example display processor used in the transparent display alignment system.

FIG. 13 is a block diagram of the display processor 306 (i.e., controller) according to an embodiment. Display processor 306 includes processor(s) 1302 (which may be a hardware and/or software implemented processor), a memory 1304, an external data interface 1306 coupled to the external data sources 302, and a display interface 1308 coupled to the transparent display 110 and the reference display 202. The display interface 1308 may include a graphics generator to drive/control the transparent display and the reference display. The display processor 306 also includes, or is coupled to, user devices 1310, such as an operator display (which may include a touchscreen), keyboard, mouse, and the like through which a user may interact with the display processor. All of the aforementioned components may be implemented in hardware, software, or a combination thereof.

Memory 1304 stores control software 1320 (referred as "control logic"), that when executed by the processor(s) 1302, causes the processor(s), and more generally, display processor 306, to perform the various operations described herein. The processor(s) 1302 may be a microprocessor or microcontroller processor (or multiple instances of such components). The memory 1304 may include read only memory (ROM), random access memory (RAM), magnetic disk storage media devices, optical storage media devices, flash memory devices, electrical, optical, or other physically tangible (i.e., non-transitory) memory storage devices. Display processor 306 may also be discrete logic embedded within an integrated circuit (IC) device or Field Programmable Gate Array (FPGA) device.

Thus, in general, the memory 1304 may comprise one or more tangible (non-transitory) computer readable storage media (which may be a non-transitory computer readable medium) (e.g., memory device(s)) encoded with software or firmware that comprises computer executable instructions. For example, control software 1320 includes logic to implement operations performed by the display processor 306. Thus, control software 1320 implements the various methods/operations described herein. The control software may generate graphical user interfaces (GUIs) through which the user may interact with the display processor, e.g., to select external objects of interest in an external scene. For example, the GUIs may present a view of an external scenes captured through a camera and permit the user to select external objects of interest in the external scene.

In addition, memory 1304 stores data 1322 used and produced by control software 1320.

In some aspects, the techniques described herein relate to a method performed using a transparent display alignment system in a vehicle, the transparent display alignment system including a transparent display through which eyes of a user behind the transparent display view an external scene in front of the transparent display, including: receiving an eye position of the eyes, a vehicle position for the vehicle, and an external object position of an external object in the external scene; computing a parallax-free position on the transparent display that intersects with a line-of-sight from the eye position to the external object position through the transparent display, at least based on the eye position, the vehicle position, and the external object position; and positioning a graphic object on the transparent display at the parallax-free position to align the eye position, the graphic object, and the external object to avoid parallax when the eyes view the external object through the transparent display.

In some aspects, the techniques described herein relate to a method, wherein positioning includes positioning the graphic object at the parallax-free position to overlap the external object when viewed through the transparent display.

In some aspects, the techniques described herein relate to a method, wherein the transparent display is physically detached from the user to allow relative movement between the user and the transparent display.

In some aspects, the techniques described herein relate to a method, wherein: receiving the eye position includes receiving the eye position as a tracked eye position from an eye tracker that tracks the eye position.

In some aspects, the techniques described herein relate to a method, further including: receiving a new tracked eye position from the eye tracker responsive to movement of the user relative to the transparent display; computing a new parallax-free position on the transparent display that intersects with a new line-of-sight from the new tracked eye position to the external object position through the transparent display; and repositioning the graphic object on the transparent display at the new parallax-free position to align the new tracked eye position, the graphic object, and the external object to avoid the parallax.

In some aspects, the techniques described herein relate to a method, wherein: computing the parallax-free position includes computing the parallax-free position further based on the eye position, the vehicle position, the external object position, and a known position of the transparent display.

In some aspects, the techniques described herein relate to a method, further including: normalizing the eye position, the vehicle position, the external object position, and the known position of the transparent display to corresponding positions in a common three-dimensional reference coordinate system having a common origin, wherein computing includes computing the parallax-free position on the transparent display based on the corresponding positions in the common three-dimensional reference coordinate system.

In some aspects, the techniques described herein relate to a method, wherein: the common origin of the common three-dimensional reference coordinate system coincides with the eye position.

In some aspects, the techniques described herein relate to a method, wherein: the vehicle position and the external object position include real-world coordinates in one or more of (i) latitude and longitude, or (ii) range, azimuth, and bearing.

In some aspects, the techniques described herein relate to a method, wherein: receiving includes receiving the external object position from one of a sensor mounted on the vehicle and an object and terrain database.

In some aspects, the techniques described herein relate to a method, wherein: receiving includes receiving the vehicle position from a global positioning system receiver.

In some aspects, the techniques described herein relate to a transparent display alignment system for parallax-free viewing in a vehicle, including: a transparent display through which eyes of a user, when positioned behind the transparent display, view an external scene in front of the transparent display; and a controller configured to perform: receiving an eye position of the eyes, a vehicle position for the vehicle, and an external object position of an external object in the external scene; computing a parallax-free position on the transparent display that intersects with a line-of-sight from the eye position to the external object position through the transparent display, at least based on the eye position, the vehicle position, and the external object position; and positioning a graphic object on the transparent display at the parallax-free position to align the eye position, the graphic object, and the external object to avoid parallax when the eyes view the external object through the transparent display.

In some aspects, the techniques described herein relate to a transparent display alignment system, wherein: the controller is configured to perform positioning by positioning the graphic object at the parallax-free position to overlap the external object when viewed through the transparent display.

In some aspects, the techniques described herein relate to a transparent display alignment system, wherein: the transparent display is physically detached from the user to allow relative movement between the user and the transparent display.

In some aspects, the techniques described herein relate to a transparent display alignment system, wherein: the controller is configured to perform receiving by receiving the eye position as a tracked eye position from an eye tracker that tracks the eye position.

In some aspects, the techniques described herein relate to a transparent display alignment system, wherein the controller is further configured to perform: receiving a new tracked eye position from the eye tracker responsive to movement of the user relative to the transparent display; computing a new parallax-free position on the transparent display that intersects with a new line-of-sight from the new tracked eye position to the external object position through the transparent display; and repositioning the graphic object on the transparent display at the new parallax-free position to align the new tracked eye position, the graphic object, and the external object to avoid the parallax.

In some aspects, the techniques described herein relate to a transparent display alignment system, wherein: the controller is configured to perform computing the parallax-free position by computing the parallax-free position further based on the eye position, the vehicle position, the external object position, and a known position of the transparent display.

In some aspects, the techniques described herein relate to a transparent display alignment system, wherein the controller is further configured to perform: normalizing the eye position, the vehicle position, the external object position, and the known position of the transparent display to corresponding ones of positions in a common three-dimensional reference coordinate system having a common origin, wherein the controller is configured to perform computing by computing the parallax-free position on the transparent display based on the positions in the common three-dimensional reference coordinate system.

In some aspects, the techniques described herein relate to a transparent display alignment system, wherein: the common origin of the common three-dimensional reference coordinate system coincides with the eye position.

In some aspects, the techniques described herein relate to a transparent display alignment system, wherein: the vehicle position and the external object position include real-world coordinates in latitude and longitude.

In some aspects, the techniques described herein relate to a transparent display alignment system for parallax-free viewing in a vehicle, including: a transparent display through which eyes of a user in the vehicle, when positioned behind the transparent display, view an external scene in front of the transparent display; aim sights spaced-apart from, and aligned with, each other to serve as an eye-alignment guide for moving the eyes to a fixed eye position behind the transparent display for the parallax-free viewing of a field-of-view (FOV) of the external scene; and a controller coupled to the transparent display to perform: computing a parallax-free position on the transparent display that intersects with a sight-line from the fixed eye position, through the transparent display, and to an external object in the FOV; and positioning a graphic object on the transparent display at the parallax-free position to avoid parallax when the external object is viewed through the transparent display from the fixed eye position.

In some aspects, the techniques described herein relate to a transparent display alignment system, wherein the transparent display is physically detached from the user to allow relative movement between the user and the transparent display.

In some aspects, the techniques described herein relate to a transparent display alignment system, wherein the controller is configured to perform positioning by: positioning the graphic object on the transparent display at the parallax-free position to align the fixed eye position, the graphic object, and the external object to avoid the parallax when the eyes view the external object through the transparent display from the fixed eye position.

In some aspects, the techniques described herein relate to a transparent display alignment system, wherein the aim sights include: a first aim sight and a second aim sight spaced-apart from the first aim sight along an aim sight-line that extends from the fixed eye position, through the transparent display, and to the FOV.

In some aspects, the techniques described herein relate to a transparent display alignment system, further including: a reference display spaced-apart from the transparent display, and wherein the first aim sight includes a visible marker presented on the transparent display, wherein the second aim sight includes a reticle presented on the reference display.

In some aspects, the techniques described herein relate to a transparent display alignment system, wherein: the visible marker is one of an aim-sight graphic displayed on the transparent display and a physical marking affixed to the transparent display.

In some aspects, the techniques described herein relate to a transparent display alignment system, wherein: the reticle is one of a graphic presented on the reference display and a physical marking affixed to the reference display.

In some aspects, the techniques described herein relate to a transparent display alignment system, wherein: the reference display is one of a physical display and virtual display configured to present the reticle.

In some aspects, the techniques described herein relate to a transparent display alignment system, wherein the controller is further configured to perform: receiving the fixed eye position, a transparent display position of the transparent display, a vehicle position for the vehicle, and an external object position of the external object in the external scene, wherein the controller is configured to perform computing by computing the parallax-free position on the transparent display based on the fixed eye position, the transparent display position, the vehicle position, and the external object position.

In some aspects, the techniques described herein relate to a transparent display alignment system, wherein the controller is further configured to perform: normalizing the fixed eye position, the vehicle position, the external object position, and the transparent display position to corresponding ones of positions in a common three-dimensional reference coordinate system having a common origin, wherein the controller is configured to perform computing by computing the parallax-free position on the transparent display based on the positions in the common three-dimensional reference coordinate system.

In some aspects, the techniques described herein relate to a method of parallax-free viewing in a vehicle, including: providing a transparent display through which eyes of a user in the vehicle, positioned behind the transparent display, view an external scene in front of the transparent display; providing aim sights that are spaced-apart from each other to serve as an eye-alignment guide for moving the eyes to a fixed eye position behind the transparent display to provide the parallax-free viewing in a field-of-view (FOV) of the external scene from the fixed eye position; computing a parallax-free position on the transparent display that intersects with a sight-line from the fixed eye position to an external object in the FOV, through the transparent display; and positioning a graphic object on the transparent display at the parallax-free position to avoid parallax when the external object is viewed through the transparent display from the fixed eye position.

In some aspects, the techniques described herein relate to a method, wherein the transparent display is physically detached from the user to allow relative movement between the user and the transparent display.

In some aspects, the techniques described herein relate to a method, wherein: positioning includes positioning the graphic object on the transparent display at the parallax-free position to align the fixed eye position, the graphic object, and the external object to avoid the parallax when the user views the external object through the transparent display from the fixed eye position.

In some aspects, the techniques described herein relate to a method, wherein the aim sights include: a first aim sight and a second aim sight spaced-apart from the first aim sight along an aim sight-line that extends from the fixed eye position, through the transparent display, and to the FOV.

In some aspects, the techniques described herein relate to a method, wherein: the first aim sight includes a visible marker on the transparent display; and the second aim sight includes a reticle on a reference display that is spaced-apart from the visible marker along the aim sight-line.

In some aspects, the techniques described herein relate to a method, wherein: the visible marker includes one of an aim-sight graphic displayed on the transparent display and a physical marking affixed to the transparent display.

In some aspects, the techniques described herein relate to a method, wherein: the reticle is presented on the reference display.

In some aspects, the techniques described herein relate to a method, further including: receiving the fixed eye position, a transparent display position of the transparent display, a vehicle position for the vehicle, and an external object position of the external object in the external scene, wherein computing includes computing the parallax-free position on the transparent display based on the fixed eye position, the transparent display position, the vehicle position, and the external object position.

In some aspects, the techniques described herein relate to a method, further including: normalizing the fixed eye position, the vehicle position, the external object position, and the transparent display position to corresponding ones of positions in a common three-dimensional reference coordinate system having a common origin, wherein computing further includes computing the parallax-free position on the transparent display based on the positions in the common three-dimensional reference coordinate system.

In some aspects, the techniques described herein relate to a method, wherein the aim sights include a first aim sight presented on the transparent display and a second aim sight presented on a reference display, wherein the method further includes, prior to providing the aim sights, aligning the first aim sight and the second aim sight along an aim sight-line from the fixed eye position to an external alignment target through the aim sights.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A transparent display alignment system, comprising:

a transparent display through which eyes of a user view an external scene in front of the transparent display, which is fixed in position and physically detached from the user;

a reference display spaced-apart from the transparent display;

aim sights, including a first visible marker on the transparent display and a second visible marker on the reference display and spaced-apart from the first visible marker along an aim site-line extending from a fixed eye position behind the transparent display, through the aim sights, and to the external scene, such that the aim sights serve as an eye-alignment guide for moving the eyes to the fixed eye position for parallax-free viewing of the external scene; and a controller coupled to the transparent display to perform:

computing a parallax-free position on the transparent display that intersects with a sight-line from the fixed eye position, through the transparent display, and to an external object in the external scene; and positioning a graphic object on the transparent display at the parallax-free position to avoid parallax when the external object is viewed through the transparent display from the fixed eye position.

2. The transparent display alignment system of claim 1, wherein the transparent display is detached from the user to allow relative movement between the user and the transparent display.

3. The transparent display alignment system of claim 1, wherein the controller is configured to perform positioning by:

positioning the graphic object on the transparent display at the parallax-free position to align the fixed eye position, the graphic object, and the external object to avoid the parallax when the eyes view the external object through the transparent display from the fixed eye position.

4. The transparent display alignment system of claim 1, wherein:

the second visible marker includes a reticle presented on the reference display.

5. The transparent display alignment system of claim 4, wherein:

the reticle includes a virtual reticle.

6. The transparent display alignment system of claim 1, wherein:

the first visible marker is a physical marker that is affixed to the transparent display.

7. The transparent display alignment system of claim 1, wherein:

the first visible marker is a virtual marker displayed on the transparent display.

8. The transparent display alignment system of claim 1, wherein:

the transparent display alignment system is deployed in an aircraft or a ground vehicle.

\* \* \* \* \*